(12) United States Patent
Chi et al.

(10) Patent No.: US 9,163,115 B2
(45) Date of Patent: Oct. 20, 2015

(54) POLYCARBONATE, PRODUCTION METHOD FOR SAME AND OPTICAL FILM COMPRISING SAME

(75) Inventors: Jun Ho Chi, Uiwang-si (KR); O Sung Kwon, Uiwang-si (KR); Jong Chan Hur, Uiwang-si (KR); Hyuck Man Kwon, Uiwang-si (KR); Chang Heon Lee, Uiwang-si (KR); Bok Nam Jang, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/355,934

(22) PCT Filed: Dec. 21, 2011

(86) PCT No.: PCT/KR2011/009958
§ 371 (c)(1),
(2), (4) Date: Aug. 1, 2014

(87) PCT Pub. No.: WO2013/077490
PCT Pub. Date: May 30, 2013

(65) Prior Publication Data
US 2015/0094444 A1     Apr. 2, 2015

(30) Foreign Application Priority Data

Nov. 21, 2011 (KR) .......................... 10-2011-0121903

(51) Int. Cl.
| | |
|---|---|
| C08G 64/00 | (2006.01) |
| C08G 64/06 | (2006.01) |
| C08G 64/30 | (2006.01) |
| G02B 1/04 | (2006.01) |
| C08G 63/02 | (2006.01) |

(52) U.S. Cl.
CPC .............. *C08G 64/06* (2013.01); *C08G 64/307* (2013.01); *G02B 1/04* (2013.01)

(58) Field of Classification Search
CPC ...................................................... C08G 64/045
USPC ................ 528/196, 198; 428/220, 411.1, 412
See application file for complete search history.

(56) References Cited

U.S. PATENT DOCUMENTS 4,746,721 A * 5/1988 Ueno et al. .................... 528/191
5,401,826 A   3/1995 Sakashita et al.

FOREIGN PATENT DOCUMENTS

| | | |
|---|---|---|
| JP | 05-339390 A | 12/1993 |
| JP | 06-248066 A | 9/1994 |
| JP | 07-199488 A | 8/1995 |
| JP | 2011-012211 A | 1/2011 |
| KR | 10-2007-0071446 A | 7/2007 |
| KR | 10-2009-0017799 A | 2/2009 |
| KR | 10-2009-0026359 A | 3/2009 |
| KR | 10-2010-0022376 A | 3/2010 |
| WO | 2013/077490 A1 | 5/2013 |

OTHER PUBLICATIONS

International Search Report in counterpart International Application No. PVT/KR2011/009958 dated Oct. 29, 2012, pp. 1-4.

* cited by examiner

*Primary Examiner* — Terressa Boykin
(74) *Attorney, Agent, or Firm* — Additon, Higgins & Pendleton, P.A.

(57) ABSTRACT

A polycarbonate of the present invention includes repeating units represented by, Formula 1, Formula 2 and Formula 3, respectively, and thus, may have excellent scratch resistance, chemical resistance and impact property.

10 Claims, No Drawings

POLYCARBONATE, PRODUCTION METHOD FOR SAME AND OPTICAL FILM COMPRISING SAME

CROSS-REFERENCE TO RELATED APPLICATIONS

This application claims priority to and the benefit of International Application No. PCT/KR2011/009958, filed Dec. 21, 2011, which published as WO 2013/077490 on May 30, 2013, and Korean Patent Application No. 10-2011-0121903, filed in the Korean Intellectual Property Office on Nov. 21, 2011, the entire disclosure of each of which is incorporated herein by reference.

TECHNICAL FIELD

The present invention relates to a polycarbonate, a method for preparing the same and an optical film comprising the same. More specifically, the present invention relates to a polycarbonate having excellent scratch resistance, chemical resistance and impact property, a method for preparing the same and an optical film comprising the same.

BACKGROUND ART

Polycarbonate resin is a representative thermoplastic material that has a heat deflection temperature of about 135° C. or higher and can exhibit superior mechanical properties including impact resistance, and excellent self-extinguishing properties, dimensional stability, heat resistance and transparency. Thus, polycarbonate resins are widely used in various applications, such as exterior materials of electronic and electric products, automobile components, and the like.

However, despite excellent transparency and mechanical properties, polycarbonate has limitations in use for exterior materials. When a plastic material is used as an exterior material, the product is often coated to enhance the aesthetics thereof. In this case, a dye diluted with various organic solvents can be applied to the surface of a molded resin article and dried. The organic solvents used as diluents can penetrate into the polycarbonate, which can decrease transparency and mechanical strength. Thus, in order to use polycarbonate in products frequently exposed to various organic solvents in the course of use, it is important for the polycarbonate to have resistance against these organic solvents.

Korean Patent Publication Nos. 2007-0071446A, 2009-0026359A and 2010-0022376A disclose methods for improving chemical resistance of a polycarbonate resin by blending with other resins having chemical resistance. Although such methods may slightly improve chemical resistance, these methods can cause deterioration in impact resistance. Further, in order to enhance impact resistance deteriorated by blending, an impact reinforcing agent may be employed. In this case, however, significant decrease in transparency of the resin can be encountered.

Japanese Patent Publication No. H5-339390A and U.S. Pat. No. 5,401,826 disclose a method for improving chemical resistance by manufacturing a copolymerized polycarbonate in which a material having chemical resistance is incorporated into a conventional polycarbonate resin.

As one example of the chemically resistant material to be copolymerized, 4,4'-biphenol is used in the copolymerization of polycarbonate resins, thereby improving chemical resistance. The polycarbonate resin may have improved chemical resistance by the use of 4,4'-biphenol, however, impact resistance of the resin may be lowered, thereby deteriorating the merits of the polycarbonate resin. As the amount of 4,4'-biphenol increases, fluidity of the resin is drastically decreased, thereby deteriorating moldability.

In addition, since the conventional polycarbonate has had a bad scratch resistance, it has been often used to blend with PMMA and the like. In this case, the polycarbonate is badly compatible with PMMA, and thus, it may result in deteriorating the other physical properties.

Therefore, there is need for developing polycarbonate having excellent self-scratch resistance.

DISCLOSURE

Technical Problem

An object of the present invention is to provide a polycarbonate having excellent scratch resistance, chemical resistance and fluidity without deterioration in impact property in comparison with a conventional polycarbonate, and a method for preparing the same.

Another object of the present invention is to provide a polycarbonate having excellent scratch resistance, chemical resistance, fluidity, room-temperature/low-temperature impact strength and heat resistance while maintaining transparency, and a method for preparing the same.

The above-mentioned aspects and other aspects may be accomplished by the present invention as explained below.

Technical Solution

One aspect of the present invention relates to a polycarbonate. The polycarbonate includes repeating units represented by Formula 1, Formula 2 and Formula 3, respectively:

[Formula 1]

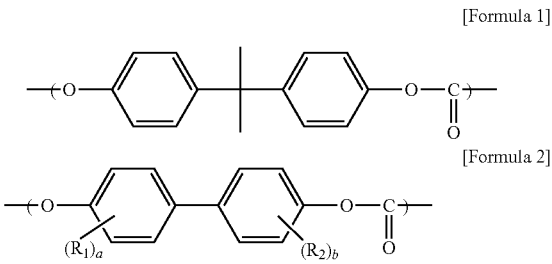

[Formula 2]

(wherein, $R_1$ and $R_2$ are each independently a substituted or unsubstituted C1 to C6 alkyl group, and a and b are each independently an integer from 0 to 4)

[Formula 3]

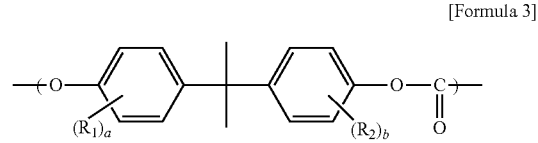

(wherein, $R_1$ and $R_2$ are each independently a substituted or unsubstituted C1 to C6 alkyl group, and a and b are each independently an integer from 1 to 4).

In one embodiment, the polycarbonate may have a molar ratio of Formula 1 (M1), Formula 2 (M2) and Formula 3 (M3) of M1:M2:M3=about 10~85 mol %:about 5~30 mol %:about 10~80 mol %.

In one embodiment, the polycarbonate may have a molar ratio of Formula 1 (M1) and Formula 3 (M3) of M1:M3=about 30~70 mol %:about 70~30 mol %.

In one embodiment, the polycarbonate may have a molar ratio of Formula 1 (M1), Formula 2 (M2) and Formula 3 (M3) which satisfies the following conditions:

M2≤M1; and
M2≤M3.

In one embodiment, the polycarbonate may have pencil hardness of H or more as measured under a loading condition of 500 g according to ASTM D3362, and a scratch width of less than about 310 μm as measured by BSP (Ball-type Scratch Profile) test.

Another aspect of the present invention relates to a method for preparing the polycarbonate. The method includes transesterifying a diol mixture comprising bisphenol A, a biphenol represented by Formula 2-1 and a dialkyl bisphenol A represented by Formula 3-1 with diaryl carbonate:

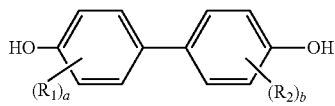

[Formula 2-1]

(wherein, $R_1$ and $R_2$ are each independently a substituted or unsubstituted C1 to C6 alkyl group, and a and b are each independently an integer from 0 to 4)

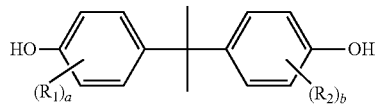

[Formula 3-1]

(wherein, $R_1$ and $R_2$ are each independently a substituted or unsubstituted C1 to C6 alkyl group, and a and b are each independently an integer from 1 to 4).

In one embodiment, a molar ratio of the bisphenol A, the biphenol and the dialkyl bisphenol A may be about 10~85 mol %:about 5~30 mol %:about 10~80 mol %.

In one embodiment, a molar ratio of the bisphenol A and the dialkyl bisphenol may be about 30~70 mol %:about 70~30 mol %.

A further aspect of the present invention relate to an optical film comprising the polycarbonate.

Advantageous Effects

The present invention has the inventive effect providing a polycarbonate having excellent scratch resistance, chemical resistance, fluidity, transparency, impact strength at room-temperature/low-temperature and heat resistance without deterioration in impact property in comparison with a conventional polycarbonate, and a method for preparing the same.

BEST MODE

As used herein, unless otherwise defined, the term "substituted" means that one or more hydrogen atoms of a compound are substituted by a halogen atom, a hydroxyl group, a nitro group, a cyano group, an amino group, an azido group, an amidino group, a hydrazino group, a carbonyl group, a carbamyl group, a thiol group, an ester group, a carboxyl group or salt thereof, a sulfonic acid group or salt thereof, a phosphate group or salt thereof, a C1 to C20 alkyl group, a C2 to C20 alkenyl group, a C2 to C20 alkynyl group, a C1 to C20 alkoxy group, a C6 to C30 aryl group, a C6 to C30 aryloxy group, a C3 to C30 cycloalkyl group, a C3 to C30 cycloalkenyl group, a C3 to C30 cycloalkynyl group, or a combination thereof.

A polycarbonate of the present invention may be prepared by transesterifying diols comprising bisphenol A, a biphenol represented by Formula 2-1, and a dialkyl bisphenol A represented by Formula 3-1 with diaryl carbonate:

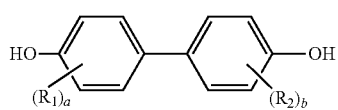

[Formula 2-1]

(wherein, $R_1$ and $R_2$ are each independently a substituted or unsubstituted C1 to C6 alkyl group, and a and b are each independently an integer from 0 to 4)

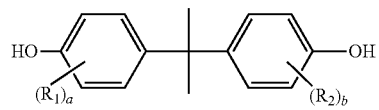

[Formula 3-1]

(wherein, $R_1$ and $R_2$ are each independently a substituted or unsubstituted C1 to C6 alkyl group, and a and b are each independently an integer from 1 to 4).

The bisphenol A is 2,2-bis-(4-hydroxyphenyl)-propane. In the diols, the bisphenol A may be present in an amount of about 10~85 mol %, preferably about 20~70 mol %, and more preferably about 30~60 mol %. Within this range, the prepared polycarbonate resin may have excellent mechanical properties such as Izod impact strength and the like.

Examples of the biphenol represented by Formula 2-1 may include 4,4'-biphenol, 2,2'-dimethyl 4,4'-biphenyldiol, 3,3-dimethyl 4,4-dihydroxy biphenyl, 2,2',6,6'-tetramethyl-4,4'-biphenol and the like. In exemplary embodiments, 4,4'-biphenol can be used. In the diols, the biphenol represented by Formula 2-1 may be present in an amount of about 5~30 mol %, preferably about 10~30 mol %, more preferably about 10~25 mol %. Within this range, the prepared polycarbonate resin may have excellent resistance to solvent.

Examples of the dialkyl bisphenol A represented by Formula 3-1 may include 2,2-bis-(3,5-dimethyl-4-hydroxyphenyl)-propane, 2,2-bis-(3,5-diethyl-4-hydroxyphenyl)-propane, 2,2-bis-(3,5-diisopropyl-4-hydroxyphenyl)-propane, 2,2-bis-(3,5-dibutyl-4-hydroxyphenyl)-propane and the like. In exemplary embodiments, 2,2-bis-(3,5-dimethyl-4-hydroxyphenyl)-propane can be used. In the diols, the dialkyl bisphenol A may be present in an amount of about 10~80 mol %, preferably about 20~80 mol %, more preferably about 30~70 mol %. Within this range, the prepared polycarbonate resin may have excellent scratch resistance having pencil hardness of F or more.

In one embodiment, a molar ratio of the bisphenol A, the Formula 2-1 and the Formula 3-1 may be about 10~85 mol %:about 5~30 mol %:about 10~80 mol %. Within this range, the prepared polycarbonate resin may have a balance among physical properties including impact strength, scratch resistance, chemical resistance and fluidity.

In particular, a molar ratio of the bisphenol A and the dialkyl bisphenol A may be about 30~70 mol %:about 30~70 mol %. Within this range, the polycarbonate having excellent impact strength and scratch resistance can be prepared.

Examples of the diaryl carbonate may include without limitation diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate, and the like. These may be used alone or in combination of two or more thereof. In exemplary embodiments, diphenyl carbonate can be used.

In one embodiment of the present invention, the diols comprising bisphenol A, Formula 2-1 and Formula 3-1 may be used in a molar ratio of about 0.6 to about 1.0, preferably about 0.7 to about 0.9 to the diaryl carbonate. Within this range, the polycarbonate resin may have excellent mechanical strength.

In one embodiment, the transesterification may be conducted at about 150 to about 300° C., preferably about 160 to about 280° C., and more preferably about 190 to about 260° C. under a reduced pressure. Within this range, reaction rate can be appropriate and side reactions can properly decrease.

Further, the transesterification may be conducted under a reduced pressure at about 100 Torr or less, for example about 75 Torr or less, preferably about 30 Torr or less, and more preferably about 1 Torr or less for at least about 10 minutes or more, preferably about 15 minutes to about 24 hours, and more preferably about 15 minutes to about 12 hours. Within this range, reaction rate can be appropriate and side reactions can properly decrease.

In one embodiment of the present invention, the transesterification may be conducted at about 160 to about 260° C. for about 2 to about 9 hours, to prepare a polycarbonate resin.

The transesterification may be conducted in the presence of alkali and alkali earth metals as a catalyst. Examples of the alkali and alkali earth metals may include without limitation LiOH, NaOH, KOH, and the like. These may be used alone or in combination of two or more thereof. The amount of the catalyst may be determined based on the amount of the aromatic dihydroxy compound. In one embodiment of the present invention, the catalyst may be used in an amount of about $1 \times 10^{-8}$ mole to about $1 \times 10^{-3}$ mole based on 1 mole of the aromatic dihydroxy compound. Within this range, the transesterification can exhibit sufficient reactivity and the production of side products due to side reaction can be minimized, which can help improve thermal stability and color stability.

In one embodiment, a sulfonic acid ester compound represented by Formula 4 or a mixture thereof may be added to the polymerized material prepared by the above reaction to prevent residual activity of the catalysts.

[Formula 4]

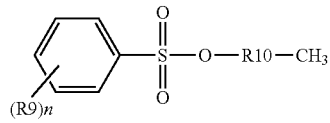

(wherein, R9 is a substituted or unsubstituted C1 to C20 alkyl group, R10 is a substituted or unsubstituted C11 to C20 alkylene group, and n is an integer from 0 to 5).

Examples of Formula 4 may include dodecyl p-toluene sulfonic acid ester, octadecyl p-toluene sulfonic acid ester, dodecyl(dodecylbenzene) sulfonic acid ester, octadecyl (dodecylbenzene) sulfonic acid ester, and the like.

In one embodiment, the sulfonic acid ester compound may be present in an amount of about 0.0001 to about 0.001 parts by weight, preferably about 0.0003 to about 0.0008 parts by weight based on 100 parts by weight of the monomer. Within this range, the polycarbonate resin may have excellent heat stability and hydrolysis resistance.

In one embodiment, a final polycarbonate may be prepared by in-situ reaction wherein the sulfonic acid ester compound is directly added to the polycarbonate obtained from the reaction. In another embodiment, the polycarbonate obtained from transesterification and the sulfonic acid ester compound may be mixed in an extrusion process. The polycarbonate prepared by the reaction may be transferred to an extruder and the sulfonic acid ester compound may be added to the extruder, followed by extruding the mixture into pellets. When adding the sulfonic acid ester compound, general additives may be added together and extruded. The additives may include without limitation flame retardants, antimicrobial agents, release agents, heat stabilizers, antioxidants, light stabilizers, compatibilizers, dyes, inorganic additives, fillers, plasticizers, impact reinforcing agents, admixtures, coloring agents, stabilizers, lubricants, antistatic agents, pigments, weatherproofing agents, UV blocks, and the like. These may be used alone or in combination of two or more thereof.

The polycarbonate thus prepared can include repeating units represented by Formula 1, Formula 2 and Formula 3, respectively:

[Formula 1]

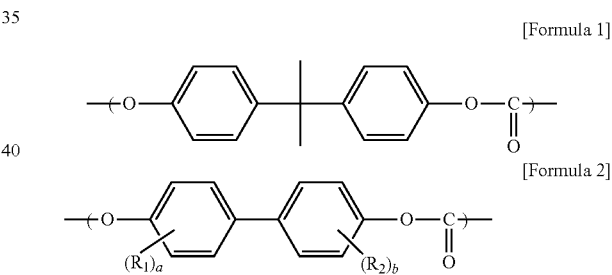

[Formula 2]

(wherein, $R_1$ and $R_2$ are each independently a substituted or unsubstituted C1 to C6 alkyl group, and a and b are each independently an integer from 0 to 4)

[Formula 3]

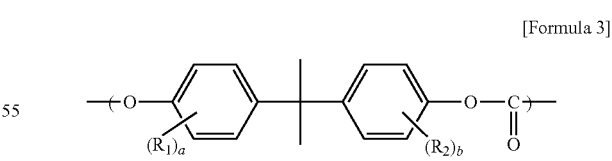

(wherein, $R_1$ and $R_2$ are each independently a substituted or unsubstituted C1 to C6 alkyl group, and a and b are each independently an integer from 1 to 4).

In one embodiment, the polycarbonate may have a molar ratio of Formula 1 (M1), Formula 2 (M2) and Formula 3 (M3) of M1:M2:M3=about 10~85 mol %:about 5~30 mol %:about 10~80 mol %, preferably M1:M2:M3=about 20~60 mol %:about 10~25 mol %:about 30~70 mol %. Within this range, the polycarbonate may have excellent fluidity, impact strength and chemical resistance, as well as particularly excellent scratch resistance and impact strength at room temperature.

In another embodiment, the polycarbonate may have a molar ratio of Formula 1 (M1) and Formula 3 (M3) of M1:M3=about 20~80 mol %:about 20~80 mol %, preferably M1:M3=about 30~70 mol %:about 30~70 mol %. Within this range, the polycarbonate having excellent impact strength at room temperature and scratch resistance can be prepared.

In a preferred embodiment, the polycarbonate may have a molar ratio of Formula 1 (M1), Formula 2 (M2) and Formula 3 (M3) which satisfies the following conditions:

M2≤M1; and
M2≤M3.

In this case, the polycarbonate may particularly have excellent scratch resistance, chemical resistance and impact strength at room temperature.

The polycarbonate may have excellent scratch resistance. For example, the polycarbonate may have pencil hardness of H or more, preferably H~3H as measured under a loading condition of 500 g according to ASTM D3362, and a scratch width of less than about 310 μm, preferably about 100~280 μm as measured by BSP (Ball-type Scratch Profile) test.

The polycarbonate resin prepared by the present invention has excellent scratch resistance, chemical resistance, fluidity and impact strength, while maintaining balance therebetween, and thus may be applied in various products. For example, the polycarbonate resin may be used for automobiles, machine parts, electric and electronic components, office machines such as computers, and miscellaneous goods and the like. In particular, the polycarbonate resin may be preferably employed not only for housings of electric and electronic products, such as TVs, computers, printers, washing machines, cassette players, stereos, cellular phones, game consoles and toys, but also for humidifiers, steam vacuum cleaners, steam irons, and the like. A molding method using the polycarbonate resin may be any conventional molding method, for example, including extrusion molding, injection molding, vacuum molding, casting molding, blow molding, calendar molding and the like. These methods are well known to a person having ordinary knowledge in the art.

In particular, the polycarbonate of the present invention has high scratch resistance, and thus, may be preferably applied to an optical film. For example, when the polycarbonate of the present invention applies to an optical film, the optical film may not need a separate protective film.

Next, the present invention will be better understood with reference to the following examples. It should be understood that these examples are provided for illustration only and are not to be in any way construed as limiting the present invention.

MODE FOR INVENTION

Example 1

2.55 kg (85 mol %) of 2,2-bis(4-hydroxyphenyl)propane (bisphenol A), 0.12 kg (5 mol %) of 4,4'-biphenol, 0.34 kg (10 mol %) of 3.3'-dimethylbisphenol A, 2.93 kg of diphenyl carbonate, and 150 ppb of KOH (based on 1 mole of bisphenol A) were sequentially added to a reactor, and oxygen in the reactor was removed using nitrogen. The reactor was heated to 160° C. and then to 190° C., at which temperature the reaction was conducted for 6 hours. After 6 hours, the reactor was further heated to 210° C. and maintained at 100 Torr for 1 hour. The reactor was heated to 260° C. and maintained at 20 Torr for 1 hour, and then was decompressed to 0.5 Torr and maintained for 1 hour. Then, 0.03 weight parts of antioxidants and 0.05 weight parts of phosphorous heat stabilizers were added to 100 weight parts of the melt polymer and uniformly mixed them at about 10 minutes to prepare a polycarbonate.

Examples 2~5

Examples 2~5 were conducted in the same manner as in Example 1 except the molar ratios of 2,2-bis(4-hydroxyphenyl)propane (bisphenol A), 4,4'-biphenol, 3.3'-dimethylbisphenol A were changed into those listed in Table 1.

Comparative Examples 1~3

Comparative Examples 1~3 were conducted in the same manner as in Example 1 except the molar ratios of diol components were changed into those listed in Table 1.

TABLE 1

|  | Examples | | | | | Comparative Examples | | |
| --- | --- | --- | --- | --- | --- | --- | --- | --- |
|  | 1 | 2 | 3 | 4 | 5 | 1 | 2 | 3 |
| BPA | 85 | 60 | 40 | 30 | 10 | 100 | 80 | 50 |
| BP | 5 | 10 | 10 | 20 | 10 | — | 20 | — |
| DMBPA | 10 | 30 | 50 | 50 | 80 | — | — | 50 |

(Unit: mol %)

The polycarbonate resins prepared in Examples and Comparative Examples were extruded using a twin-screw extruder (L/D=36, φ=32) at 270° C. and formed into pellets using a pelletizer. The prepared pellets were formed into 2.5 mm thick specimens and ⅛" IZOD specimens at a molding temperature of 270° C. and a mold temperature of 70° C. using an injection machine (DHC 120WD, DONGSHIN HYDRAULICS CO., 120 ton). Physical properties of the specimens were evaluated as follows and the obtained results are shown in Table 2.

Evaluation Methods of Physical Properties (1) Melt index (MI, g/10 min): Melt index is measured at 250° C. and a load of 10 kg using a flow index tester (Model No.: F-W01, manufactured by TOYOSEIKI).

(2) Haze: It is measured using Haze meter NDH 2000 equipment (NIPPON DENSHOKU). Haze (%) is calculated by diffuse transmittance light (DF)/total transmittance light (TT).

(3) Tensile elongation: Tensile elongation is evaluated in a ⅛" thick specimen according to ASTM D638.

(4) BSP (Ball-type Scratch Profile) test: Scratches having lengths of 10~20 mm are applied on a surface of resin at a loading of 1000 g and a speed of 75 mm/min using a metal tip of a sphere shape having a diameter of 0.7 mm. And then, profile of scratches is measured by surface scanning the profile of the applied scratches using a tip of metal stylus having a diameter of 2 μm through a contact type surface profile analyzer (XP-1). After that, a scratch width (μm) that is a measure of scratch resistance is determined from the measured scratch profile. At this time, as the scratch width is decreased, scratch resistance is increased.

(5) Pencil hardness: Pencil hardness is measured at a loading condition of 500 g in accordance with ASTM D3362. The more pencil hardness is increased, the more scratch resistance is increased. Further, the more blackness is increased, the more scratch resistance is deteriorated.

(6) Impact strength (kg·cm/cm): Notches were formed into a ⅛" IZOD specimen, followed by evaluation according to ASTM D256 at room temperature.

(7) Chemical resistance:

Chemical resistance to alcohols: A tensile specimen in accordance with ASTM D638 is prepared via injection molding, after which a 2.1% strain is applied to the specimen according to ASTM D543 for evaluating Environmental Stress Crack Resistance and methanol and isopropyl alcohol are dropped thereto. After 10 minutes, cracks generated on a curved part are observed. (⊚: No crack, ○: Fine cracks, Δ: Many cracks, X: Haze of cracks)

Transmittance after immersing in coating solution: A 2.5 mm flat specimen is immersed in a coating thinner (main ingredients: methyl isobutyl ketone, cyclohexanone, 2-ethoxyethanol) for a polycarbonate resin for 2 minutes and dried at 80° C. for 30 minutes, followed by measurement of visible transmittance (%) using a hazemeter (Gmbh 4725, BYK-GARDNER)

TABLE 2

|  |  | Examples | | | | | Comparative Examples | | |
| --- | --- | --- | --- | --- | --- | --- | --- | --- | --- |
|  |  | 1 | 2 | 3 | 4 | 5 | 1 | 2 | 3 |
| MI (250/10 kg) | | 28.6 | 30.2 | 29.5 | 30.7 | 31.0 | 30.1 | 29.5 | 30.2 |
| Haze (%) | | 1.2 | 1.4 | 1.4 | 1.5 | 1.4 | 1.2 | 1.3 | 1.4 |
| Tensile elongation (%) | | 92 | 74 | 62 | 56 | 35 | 110 | 30 | 51 |
| BSP (width, μm) | | 306 | 270 | 253 | 255 | 225 | 346 | 340 | 255 |
| Pencil hardness | | HB | F | H | H | 2H | 2B | 2B | H |
| Impact strength (⅛") | | 30.5 | 10.5 | 6.1 | 6.4 | 3.5 | 72.0 | 33.5 | 3.5 |
| Chemical resistance | Alcohols* | ○ | ⊚ | ⊚ | ⊚ | ⊚ | X | ⊚ | X |
| | Transmittance (%) | 80 | 88 | 88 | 88 | 88 | <10 | 88 | <10 |

As indicated in Table 2, it was found that the polycarbonate of the present invention had all of excellent scratch resistance, impact strength and chemical resistance. On the contrary, Comparative Example 1, which used BPA alone as the diol component, had excellent impact strength, but had remarkably deteriorated scratch resistance and chemical resistance. Comparative Example 2, which did not use dialkyl bisphenol A, also had a deteriorated scratch resistance. Moreover, Comparative Example 3, which did not use biphenol, had notably deteriorated chemical resistance.

Simple modifications or changes of the present invention can be easily carried out by one skilled in the art to which this invention pertains. Therefore, it is to be understood that such modifications or changes are intended to be included within the scope of the appended claims.

The invention claimed is:

1. A polycarbonate comprising repeating units represented by Formula 1, Formula 2 and Formula 3, respectively:

[Formula 1]

[Formula 2]

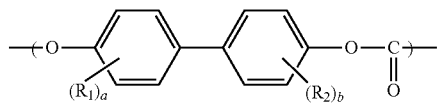

wherein, $R_1$ and $R_2$ are each independently a substituted or unsubstituted C1 to C6 alkyl group, and a and b are each independently an integer from 0 to 4,

[Formula 3]

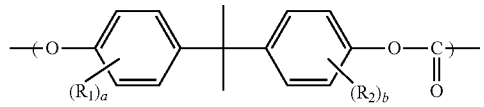

wherein, $R_1$ and $R_2$ are each independently a substituted or unsubstituted C1 to C6 alkyl group, and a and b are each independently an integer from 1 to 4.

2. The polycarbonate as claimed in claim 1, wherein the polycarbonate has a molar ratio of Formula 1 (M1), Formula 2 (M2) and Formula 3 (M3) of M1:M2:M3=about 10~85 mol %:about 5~30 mol %:about 10~80 mol %.

3. The polycarbonate as claimed in claim 1, wherein the polycarbonate has a molar ratio of Formula 1 (M1) and Formula 3 (M3) of M1:M3=about 30~70 mol %:about 70~30 mol %.

4. The polycarbonate as claimed in claim 1, wherein the polycarbonate has a molar ratio of Formula 1 (M1), Formula 2 (M2) and Formula 3 (M3) which satisfies the following conditions:

M2≤M1; and

M2≤M3.

5. The polycarbonate as claimed in claim 1, wherein the polycarbonate has pencil hardness of H or more as measured under a loading condition of 500 g according to ASTM D3362, and a scratch width of less than about 310 μm as measured by BSP (Ball-type Scratch Profile) test.

6. A method for preparing polycarbonate comprising transesterifying diol mixtures comprising bisphenol A, biphenol represented by Formula 2-1 and dialkyl bisphenol A represented by Formula 3-1 with diaryl carbonate:

[Formula 2-1]

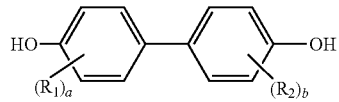

wherein, $R_1$ and $R_2$ are each independently a substituted or unsubstituted C1 to C6 alkyl group, and a and b are each independently an integer from 0 to 4,

[Formula 3-1]

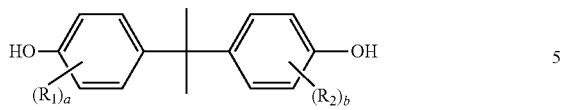

wherein, $R_1$ and $R_2$ are each independently a substituted or unsubstituted C1 to C6 alkyl group, and a and b are each independently an integer from 1 to 4.

7. The method as claimed in claim 6, wherein a molar ratio of the bisphenol A, the biphenol and the dialkyl bisphenol A is about 10~85 mol %:about 5~30 mol %:about 10~80 mol %.

8. The method as claimed in claim 6, wherein a molar ratio of the bisphenol A and the dialkyl bisphenol A is about 30~70 mol %:about 30~70 mol %.

9. An optical film comprising the polycarbonate of claim 1.

10. The polycarbonate as claimed in claim 1, wherein the polycarbonate has a molar ratio of Formula 1 (M1), Formula 2 (M2) and Formula 3 (M3) of M1:M2:M3=about 20~65 mol %:about 10~25 mol %:about 30~70 mol %.

* * * * *